June 4, 1968 J. M. MADER 3,387,122

MAGNETIC MULTIPLIER/DIVIDER SYSTEMS

Filed June 9, 1965 2 Sheets-Sheet 1

June 4, 1968 J. M. MADER 3,387,122

MAGNETIC MULTIPLIER/DIVIDER SYSTEMS

Filed June 9, 1965 2 Sheets-Sheet 2

United States Patent Office 3,387,122
Patented June 4, 1968

3,387,122

MAGNETIC MULTIPLIER/DIVIDER SYSTEMS

James M. Mader, Lansdale, Pa., assignor to Leeds & Northrup Company, a corporation of Pennsylvania Filed June 9, 1965, Ser. No. 462,640
6 Claims. (Cl. 235—195)

This invention relates to magnetic multipliers having a saturable core transformer and producing an output signal which varies in dependence upon DC input voltages, at least one of which is variable in magnitude with changes in magnitude of temperature, pressure or other monitored condition.

With magnetic multipliers of prior types, the output signal has an error component which is due to core characteristics and which is of increasing significance as one of the variable input voltages approaches zero value. Also prior magnetic multipliers utilizing regenerative action for core reset have the further disadvantage that they become inoperative for low finite values of such a variable input voltage.

In accordance with the present invention, one of the variable input voltages is combined with a fixed offset voltage jointly to provide, for either a regenerative or non-regenerative magnetic multiplier, an input of magnitude insuring continuous operation of the multiplier throughout a range, including zero, of the variable input voltage, and the resulting output of the multiplier is combined with a preselected value of another input voltage effectively to cancel those components of the output signal which are due to the core error and to the offset signal. By preselection of the magnitude of the fixed offset voltage, the magnetic multiplier may be adapted for one-quadrant, two-quadrant or four-quadrant operation; all modes of operation providing an output signal which is absent the core error component.

More particularly, the voltage periodically applied to one of the windings to set the core corresponds with the algebraic sum of a fixed offset voltage and a first variable input voltage; the voltage periodically applied to a second of the core windings to reset the core corresponds with a second input voltage; a third input voltage is periodically sampled, the sampling time dependent upon the voltage induced, during resetting of the core in a third winding of the core; and the resulting output signal of the magnetic multiplier is combined, as in a differential amplifier, with a preselected percentage of the third input voltage so to provide an output signal compensated both for the fixed offset voltage and the core error.

The invention further resides in magnetic multiplier systems having new and useful features of combination and arrangement hereinafter described and claimed.

For a more detailed understanding of the invention, reference is made to the following description of preferred embodiments thereof and to the accompanying drawings in which.

Figure 1:
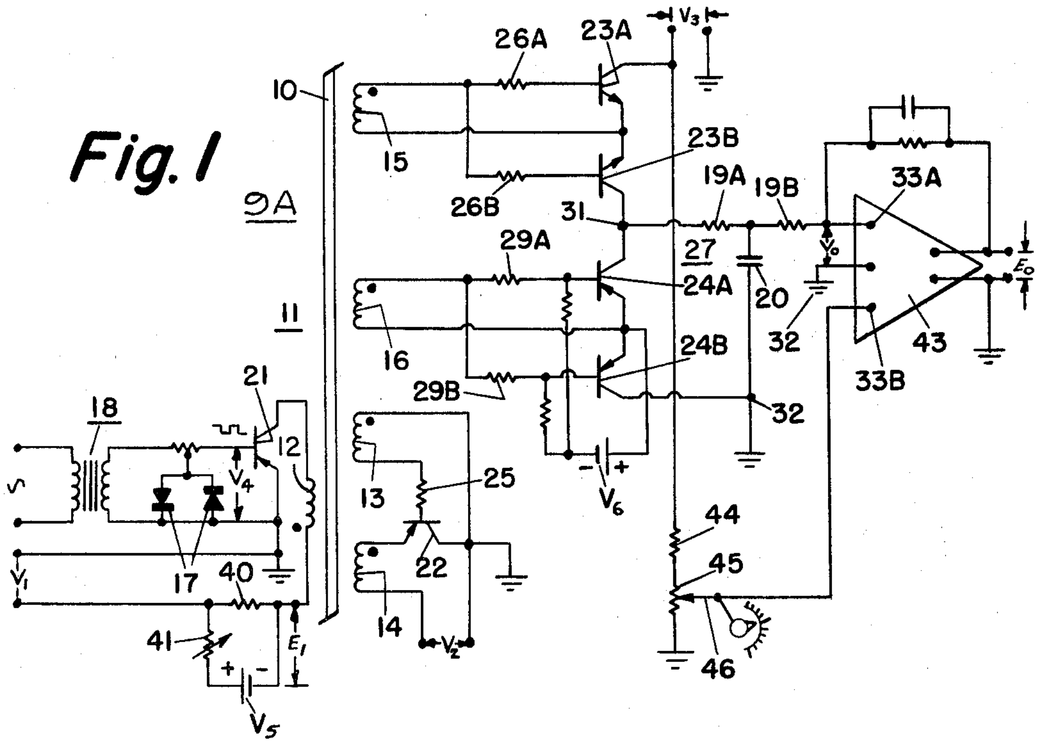
FIG. 1 is a circuit schematic of a magnetic multiplier system.

The magnetic multiplier system 9A shown in FIG. 1 comprises a transformer 11 whose saturable core 10 is provided with a plurality of windings 12–16, magnetically coupled to each other and in circuit with solid-state switching devices exemplified by transistors 21, 22, 23A, 23B, 24A, 24B. The winding 12 of transformer 11 is connected in the output or emitter-collector circuit of transistor 21 in series with a source of DC input voltage V1 whose magnitude may correspond with the magnitude, or changes in magnitude, of a measured variable such as temperature, pressure, pH, frequency, generation or other physical, chemical or electrical condition. The transistor 21 is alternately switched to conductive and non-conductive states at constant repetition frequency, for example, 60 cycles per second, as by a square-wave voltage V4. Specifically, the switching voltage V4 may be derived from an AC source connected via transformer 18 to the reversely poled clipping diodes 17, 17 connected in shunt to the input or base-emitter circuit of transistor 21.

The winding 13 of transformer 11 is connected in the input or base-collector circuit of transistor 22 in series with resistor 25. The winding 14 of transformer 11 is connected in the output or emitter-collector circuit of transistor 22 in series with the source of DC voltage V2. This second input voltage may be constant or may be variable with changes in temperature, pressure or other condition. The windings 13, 14 are poled in sense affording a regenerative reset action later described.

The winding 15 of transformer 11 is connected in series with resistors 26A, 26B respectively in the input or base-emitter circuits of transistors 23A, 23B. Specifically, one terminal of winding 15 is connected to the emitters of transistors 23A, 23B and the other terminal of winding 15 is connected via resistors 26A, 26B to the bases of transistors 23A, 23B. The collector electrodes of transistors 23A, 23B, which may be of the NPN type 2N1308, are connected back-to-back in series with the source of DC voltage V3 and with the resistor 19A and capacitor 20 of an integrating-filtering network 27. This third input voltage V3 of the magnetic multiplier also may be representative of a measured variable so that with voltage V2 fixed in magnitude, the output voltage V0 appearing across the output terminals 32, 33A of the network 27 is substantially proportional to the product of voltages V1 and V3. With voltage V2, also varied in accordance with a third variable condition, the output voltage V0 of the network 27 additionally varies as an inverse function of voltage V2 so to effect, for example, temperature compensation of the product V1, V3.

The winding 16 of transformer 11 is connected in series with resistors 29A, 29B respectively in the input or base-emitter circuits of transistors 24A, 24B. Specifically, one terminal of winding 16 is connected to the emitters of transistors 24A, 24B and the other terminal of winding 16 is connected via resistors 29A, 29B to the bases of transistors 24A, 24B. The collector electrodes of transistors 24A, 24B, which may be of the PNP type 2N1305, are connected back-to-back in series between the input terminals 31, 32 of the integrating-filtering network 27. The transistors 24A, 24B are biased to normal non-conductive state by battery V6 or other fixed DC source.

For purposes of explanation of the operation of FIG. 1 as thus far described, it is assumed that at the beginning of each cycle of switching voltage V4, the core 10 of transformer 11 is saturated in positive direction or sense, i.e., that its residual flux density is at a maximum corresponding with or closely approximating point M (FIG.

Figure 3:
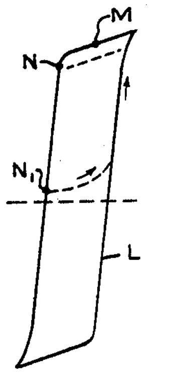
FIG. 3 is exemplary of the magnetization curve of a saturable core.
Figure 4A:
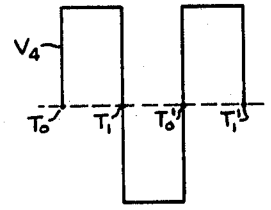
FIGS. 4A–4D are explanatory figures referred to in discussion of the systems of FIGS. 1 and 2 absent the present invention.
Figure 5A:
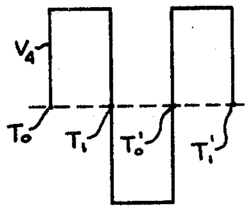
FIGS. 5A–5D are explanatory figures referred to in discussion of FIGS. 1 and 2 with the present invention incorporated therein.
Figure 4B:
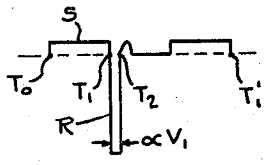

3) of the major hysteresis loop L of the core magnetization characteristic. During the first half of each cycle, the voltage V4 is effective to switch the transistor 21 to conductive state so that during the corresponding time interval $T_0$–$T_1$ (FIG. 4A), the input voltage V1 as applied to winding 12 is effective to drive the core flux away from the positive saturation value M (FIG. 3) to a less positive or more negative saturation value. For a low value of variable input voltage V1, the core is driven lightly, as to a corresponding flux value N, and the corresponding change in flux density of the core may be exemplified by a set pulse S (FIG. 4B). For higher and higher values of input voltage V1, the core flux is driven to correspondingly greater extents from the positive saturation value M toward the opposite or negative saturation value definitive of the maximum usable value of V1.

Figure 4C:
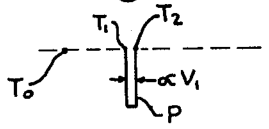
Figure 4D:
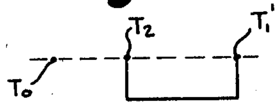
Figure 5D:
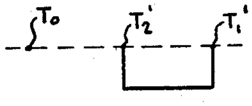

Upon termination of the halfwave interval $T_0$–$T_1$ of the switching voltage V4, the transistor 21 reverts to nonconductive state. The inductive kick, due to termination of current flow in winding 12, induces in the core winding 13 a voltage whose intended purpose is to switch the transistor 22 to conductive state. The resulting change in core-flux density, due to flow of current from source V2 through winding 14, is in sense to reset the core and also in sense such that the voltage induced in coil 13 induces continued conduction by transistor 22. Because of such regenerative action, the core density is returned to positive saturation, at which time the regenerative action ceases and transistor 22 becomes non-conducting. The time interval $T_1$–$T_2$ (FIG. 4B) required to reset the core corresponds, in the system as thus far described, with the value of the input signal V1: in other words, the width of the reset pulse R (FIG. 4B) is substantially proportional to the input voltage V1. During resetting of core 10, the transistors 23A, 23B are switched to the conductive state by the voltage induced in output winding 15. Thus, during the time interval $T_1$–$T_0'$ (FIG. 4A) for which transistors 24A, 24B are non-conductive, a voltage pulse P (FIG. 4C) is applied to input terminals 31, 32 of the integrator network 27. Since the amplitude of pulse P corresponds with the amplitude of the input voltage V3 and the duration of pulse P is proportional to V1, its integrated DC component V0, as appearing at the output terminals 32, 33A of network 27, is substantially proportional to each of the two input voltages V1, V3 and to their product V1 and V3. Such proportionality for successive cycles of the switching voltage V4 is maintained by insuring that essentially no voltage appears across input terminals 31, 32 of the network 27 during the non-conductive periods of transistors 23A, 23B. Such condition is insured, as in White Patent 3,165,650, by provision of transistors 24A, 24B and the circuitry which provides that they are always in state opposite to that of transistors 23A, 23B. During resetting of core 10, the transistors 24A, 24B are non-conductive because of the polarity of the voltage induced in core winding 16. Thus, during the interval $T_1$–$T_2$ for which transistors 23A, 23B are conductive, the transistors 24A, 24B appear as a very high impedance across input terminals 31, 32 of network 27, with correspondingly negligible attenuation of its output voltage V0. Upon completion of resetting of core 10, the transistors 24A, 24B are switched to conductive state at time $T_2$ and so appear as a very low impedance across input terminal 31, 32 of network 27 for the interval $T_2'$ to $T_1'$ (FIG. 4D).

The magnetic multiplier 9A of FIG. 1 as thus far described has two basic limitations: (1) because the squareness ratio of saturable cores is always less than the ideal of 1.00, the width of the output pulse P (FIG. 4C) is always greater than it should be and the percent error, due to this core characteristic, is increasingly significant as the value of input voltage V1 approaches zero; and (2) below a certain threshold value of input voltage V1, the magnetic multiplier 9A ceases to operate because the inductive kick, due to switching off of current in winding 12, is insufficient to initiate the regenerative reset action above described. In brief, within the range of operation of the basic magnetic multiplier 9A, its output voltage V0 contains a core-error component, and below a finite threshold value of input voltage V1, the magnetic multiplier 9A produces no output, In accordance with the present invention, both of such basic limitations of magnetic multiplier 9A are overcome (1) by combining the variable input voltage V1 with a fixed offset voltage V5 to provide for winding 12 an input voltage $E_1$ of magnitude insuring resetting of the core throughout a continuous range of variation, including zero, of voltage V1; and (2) by algebraically combining a preselected percentage of the input voltage V3 with the output of the multiplier to cancel therefrom those components corresponding with the core-error and with the offset voltage V5. In consequence, the compensated multiplier output is accurately proportional to the product $V1.V3/V2$ throughout a variation of V1 including zero.

Figure 5B:
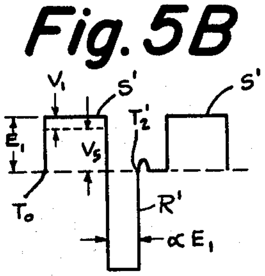
Figure 5C:
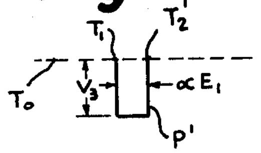

Specifically and as shown in FIG. 1, the sources of V1 and V5 are connected via resistors 40, 41 in circuit with the core winding 12 jointly to provide the input voltage $E_1$. Another arrangement, including a summing amplifier, for providing for core winding 12 a variable input voltage $E_1$ proportional to the alegbraic sum of V1 and V5, is discussed in connection with FIG. 2 and may be used in the system of FIG. 1. In either case, the value of the fixed offset voltage V1 is preselected so that, throughout a continuous range of variation including zero of voltage V1, the input voltage $E_1$ is of magnitude insuring resetting of the core. For the same low value of V1 assumed for FIGS. 4B, 4C, the widths of the core-set pulses, the core-reset pulses and the output pulses are now substantially increased as evident from direct comparison of pulses S, R (FIG. 4B) with pulses S', R' (FIG. 5B) and of pulse P (FIG. 4C) with pulse P' (FIG. 5C). Such increased width occurs because for the same low value of V1 for which the core was previously driven or set to point N (FIG. 3), it is now driven by voltage $E_1$ to substantially greater extent to point $N_1$; for example, the resulting output voltage V0 of the network 27 now has two extraneous components, one corresponding with offset voltage $E_5$ and the other due to the core-error. Such output voltage V0 is applied to one pair of input terminals 32, 33A of a differential amplifier 43 which is preferably, though not necessarily, of transistor type. To the other pair of input terminals 32, 33B of amplifier 43 is applied a preselected percentage of the input voltage V3. Specifically for such purpose, the source of input voltage $E_3$ may be connected to a potential-divider comprising resistor 44 and potentiometer 45. The adjustable contact 46 of potentiometer 45 is connected to the ungrounded input terminal 33B of amplifier 43 and is set so that the output voltage $E_0$ of the differential amplifier 43 is absent both the core-error and C5 components of the V0 input applied to the inverting channel of amplifier 43. It will be understood that such cancellation occurs because of application to the non-inverting channel of amplifier 43 of the proper percentage of the pulse height determining input voltage $E_3$.

In brief, with the effective value of the offset voltage V5 set at suitable finite value, the potentiometer 45, or equivalent, may be set completely to cancel the error due to the less-than-perfect core characteristics and the zero offset due to voltage V5.

It is also to be noted that the magnetic multiplier system 9A, as modified to eliminate the two basic limitations, is also capable of four-quadrant operation. By selection or adjustment of the values of resistors 40, 41, the width of the reset pulse R' (FIG. 5B) may be made, for zero value of V1, approximately one-half of the maximum pulse width. With potentiometer 45 then set to obtain a zero value of $E_0$, the output voltage $E_0$ will vary from positive values to negative values as the input voltage V1 varies from positive values to negative values. By reversing the polarity of input voltage V3, the output voltage $E_0$ will vary from negative values to positive values as input V1 varies from positive values to negative values. For operation in four quadrants, the core-error is essentially zero.

Figure 2:
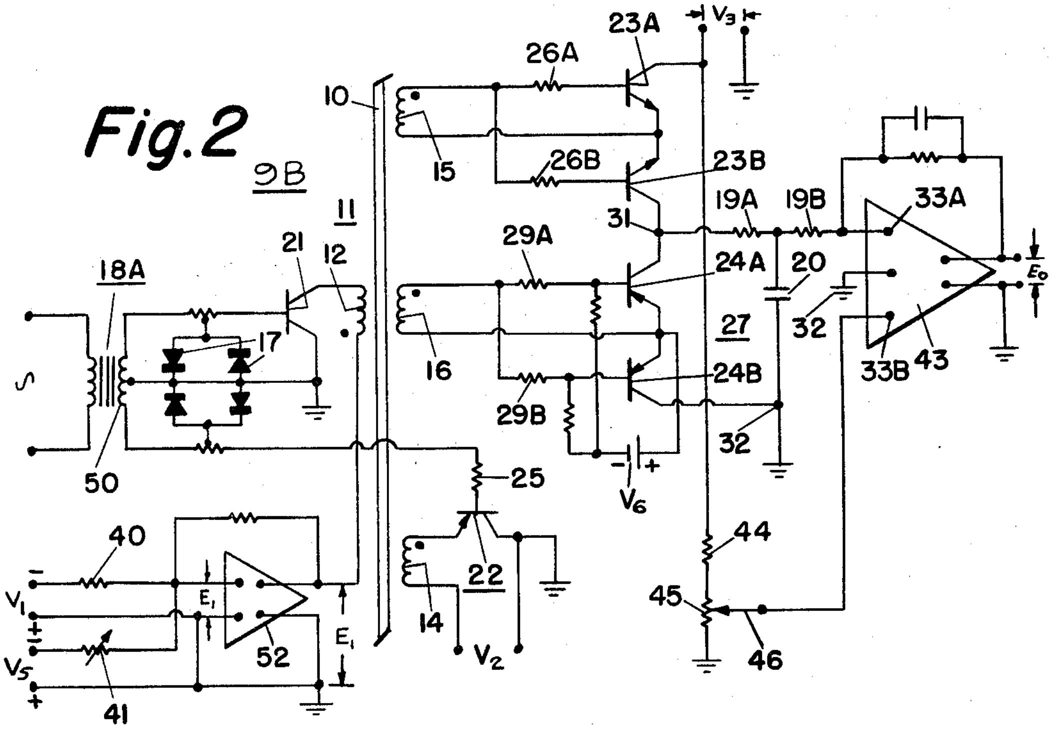
FIG. 2 is a circuit schematic of a modification of the system of FIG. 1.

Except for differences below specifically discussed, the magnetic multiplier system 9B of FIG. 2 is the same in composition and mode of operation as that of FIG. 1. The corresponding elements of both figures are identified by like reference characters so that it does not appear necessary to repeat the description of most of the circuitry of FIG. 1.

In the magnetic multiplier system 9B of FIG. 2, the input pulses for transistor 22 of the core-reset circuit are not derived, as in FIG. 1, from a winding of the saturable core 10. Instead, the pulse transformer 18A may be provided with an additional secondary winding or section 50 so that the pulses applied to the input circuit of transistor 22 are 180° out of phase with respect to the pulses applied to the input circuit of the core transistor 21.

Also, in the magnetic multiplier system 9B of FIG. 2, a transistor preamplifier 52 is interposed between the input winding 12 of core 10 and the voltage sources V1, V5. Specifically, the low impedance output circuit of the summing amplifier 52 is connected in series between coil 12 and the emitter-collector circuit of transistor 21.

The input terminals of summing amplifier 52 are connected across the voltage sources V1, V5 via the summing resistors 40, 41 so that the output voltage $E_1$ of amplifier 52 is proportional to the algebraic sum of the offset voltage V5 and the variable input voltage $E_1$. As in the system of FIG. 1, the value of offset voltage V5 may be selected to afford two-quadrant or four-quadrant operation with V1 varying over a continuous range, including zero, from positive to negative values or from negative to positive values.

It is to be understood the invention is not limited to the specific systems described but comprehends modifications and equivalents within the scope of the appended claims; for example, the switching devices need not be solid-state type and may be of photoresistive type, or may be electromechanical relays in applications where high-speed is not of essence.

What is claimed is:

1. A magnetic multiplier system comprising
- a saturable core transformer having a plurality of windings,
- means for periodically setting said core, said core-setting means including
  - a first source of variable DC input voltage,
  - a source of finite DC offset voltage, and
  - means for effecting periodic application to a first of said core windings of a voltage of fixed frequency and of magnitude proportional to the algebraic sum of said variable DC input voltage and said DC offset voltage;
- means including a second of said core windings for periodically resetting said core by pulses of said fixed frequency, of duration proportional to said algebraic sum of said first variable DC input voltage and said DC offset voltage, and of amplitude dependent upon a second input voltage,
- means including a third of said core windings for periodically sampling a third DC input voltage to produce output pulses of said fixed frequency, of amplitude dependent upon said third input voltage, and of duration inversely proportional to said second input voltage and proportional to said algebraic sum of said first input voltage and said offset voltage, said output pulses having components related to said DC offset voltage and to an inherent core-error, and
- means for combining said output pulses and a preselected percentage of said third input voltage to produce an output proportional to the product of said first input voltage times the ratio of said third input voltage to said second input voltage, said product output being absent components corresponding with said DC offset voltage and with the core-error.

2. A magnetic multiplier system as in claim 1 in which the means for periodically setting the core includes a summing amplifier having said first core winding in its output circuit and having the sources of said first DC input voltage and said DC offset voltage in its input circuit.

3. A magnetic multiplier system as in claim 1 in which the means for periodically resetting the core additionally includes switch means having said second core winding in its output circuit, and having a fourth core winding in its input circuit and regeneratively coupled to said second core winding, said DC offset voltage being of magnitude selected to maintain operation of the magnetic multiplier over a continuous range of variation, including zero, of said first DC input voltage.

4. A magnetic multiplier system as in claim 1 in which the last-named means includes a differential amplifier having in one input circuit an integrating network to which said output pulses are applied and having in its other input circuit a potential-divider for application thereto of a preselected percentage of said second input voltage.

5. A magnetic multiplier system comprising
- a saturable core transformer having a plurality of windings,
- means for driving said core from saturation in one sense comprising a first solid-state switching device,
  - the input circuitry of said first switching device including a source of switching pulses of fixed frequency and duration,
  - the output ircuitry of said switching device including a first source of variable DC input voltage, and a source of offset voltage for production of core-setting pulses of amplitude proportional to the algebraic sum of said first input voltage and said offset voltage,
- means including a second solid-state switching device for resetting the core to original state in the interval between successive core-setting pulses,
  - the output circuitry of said second switching device including one of the windings of said core and a second source of DC input voltage for production of core-resetting pulses of width inversely proportional to said second input voltage,
- a third solid-state switching device,
  - the input circuitry of said third switching device including another of said core windings,
  - the output circuitry of said third switching device including a third source of DC input voltage in series with an averaging network, said third switching device being conductive during resetting of the core to apply to said network DC pulses of amplitude proportional to the algebraic sum of said first input voltage and said offset voltage and of width inversely proportional to said second input voltage and also directly proportional to said algebraic sum of said first input and offset voltages, and
- combining means for algebraically adding a preselected percentage of said third input voltage to the DC output of said averaging network, the value of said offset voltage being selected to insure periodic setting and resetting of the core even at zero value of the first input signal and said percentage of said third input voltage being selected to obtain zero output of the system for zero value of said first input voltage at said selected value of the offset voltage.

6. A magnetic multiplier system as in claim 5 in which the last-named means comprises
- a differential amplifier having one of its input circuits connected in the output circuit of said averaging network, and
- potential-divider means for applying a selected percentage of said third input voltage to the other input circuit of said differential amplifier.

References Cited

UNITED STATES PATENTS

| | | | |
|---|---|---|---|
| 3,011,714 | 12/1961 | Wheeler | 235—178 X |
| 2,808,990 | 10/1957 | Van Allen. | |

OTHER REFERENCES

Aiee Transactions, November 1955, pp. 643–648.

MALCOLM A. MORRISON, *Primary Examiner.*

J. F. RUGGIERO, *Assistant Examiner.*